United States Patent [19]
Quesada

[11] Patent Number: 5,582,377
[45] Date of Patent: Dec. 10, 1996

[54] BAG AND CLOTHING HANGER WITH FENCE CLASP

[76] Inventor: Genaro E. Quesada, 28324 Merridy Ave., Highland, Calif. 92346

[21] Appl. No.: 860,070

[22] Filed: Mar. 30, 1992

[51] Int. Cl.[6] ................................................ F16M 11/00
[52] U.S. Cl. ........................... 248/229.12; 248/227.1; 248/231.41; 248/316.4; 248/215; 248/303; 248/229.22; 24/343; 24/523; 24/600.7
[58] Field of Search ........................... 248/227.1, 229.12, 248/231.41, 316.4, 305, 215, 301, 303, 221.4, 220.2, 229.22; 24/343, 523, 600.7

[56] References Cited

U.S. PATENT DOCUMENTS

| | | |
|---|---|---|
| 74,897 | 2/1868 | Covert . |
| 167,620 | 9/1875 | Richards . |
| 227,982 | 5/1880 | Larson ................................ 24/600.7 X |
| 330,991 | 11/1885 | Mathews ................................ 24/523 |
| 582,220 | 5/1897 | McClory . |
| 815,893 | 3/1906 | Adams et al. ........................ 248/305 |
| 1,688,148 | 10/1928 | Martin ................................ 248/229 |
| 1,696,077 | 12/1928 | Dean . |
| 2,920,369 | 1/1960 | Zezula ................................ 248/231.4 X |
| 3,509,882 | 5/1970 | Blake ................................ 24/523 X |
| 3,567,267 | 3/1971 | Lechner ................................ 294/78 |
| 3,972,499 | 8/1976 | Simmons ................................ 248/224 |
| 4,098,479 | 7/1978 | Hartstone et al. ................... 248/214 |
| 4,582,284 | 4/1986 | Veenstra ................................ 248/220.2 |
| 4,953,817 | 9/1990 | Mosteller ................................ 248/222.2 |

FOREIGN PATENT DOCUMENTS

| | | | |
|---|---|---|---|
| 471831 | 2/1929 | Germany ................................ 248/227 |

*Primary Examiner*—Karen J. Chotkowski
*Attorney, Agent, or Firm*—Knobbe Martens Olson & Bear

[57] ABSTRACT

A device for hanging articles, such as clothing, athletic equipment, and equipment bags, from a chain link fence or the like, comprises an elongate body having a front side and a rear side. On the rear side is a spring-loaded fence-gripping clasp, dimensioned for releasably grasping the wires of the fence. The fence-gripping clasp comprises a fixed fence-gripping jaw and a movable fence-gripping jaw, spring-biased toward the fixed fence-gripping jaw. On the front side is a spring-loaded hanger clasp, specifically adapted for releasably grasping an article having a strap or handle, but also suitable for hanging an article of clothing. The hanger clasp comprises a fixed hanger jaw and a movable hanger jaw, spring-biased to close against the fixed hanger jaw. In a preferred embodiment, the hanger clasp is disposed near the lower end of the elongate body, and a fixed clothes hook extends from the front of the body, above the hanger clasp.

10 Claims, 2 Drawing Sheets

U.S. Patent
Dec. 10, 1996
Sheet 1 of 2
5,582,377
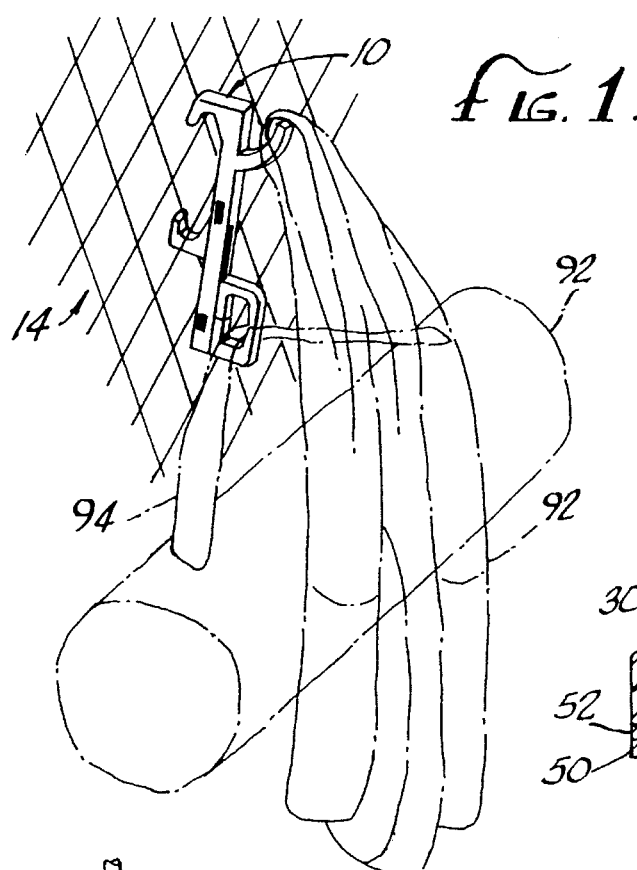
fig. 1.
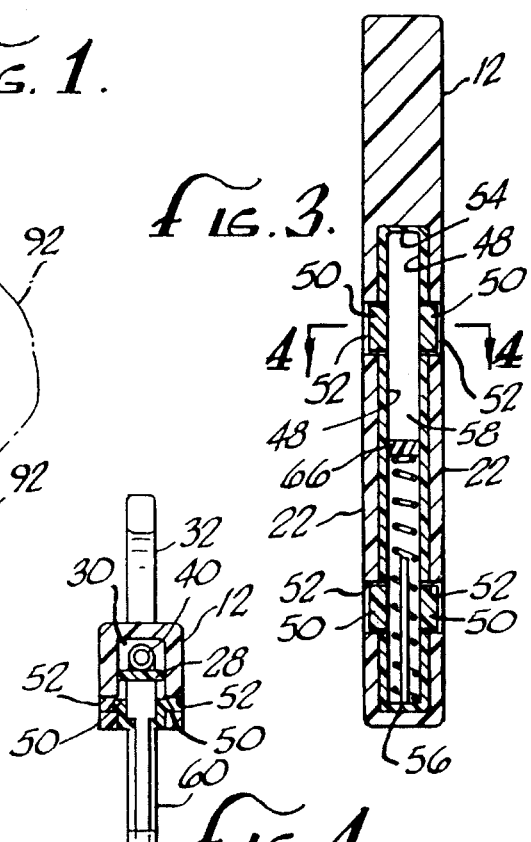
fig. 3.
fig. 4.
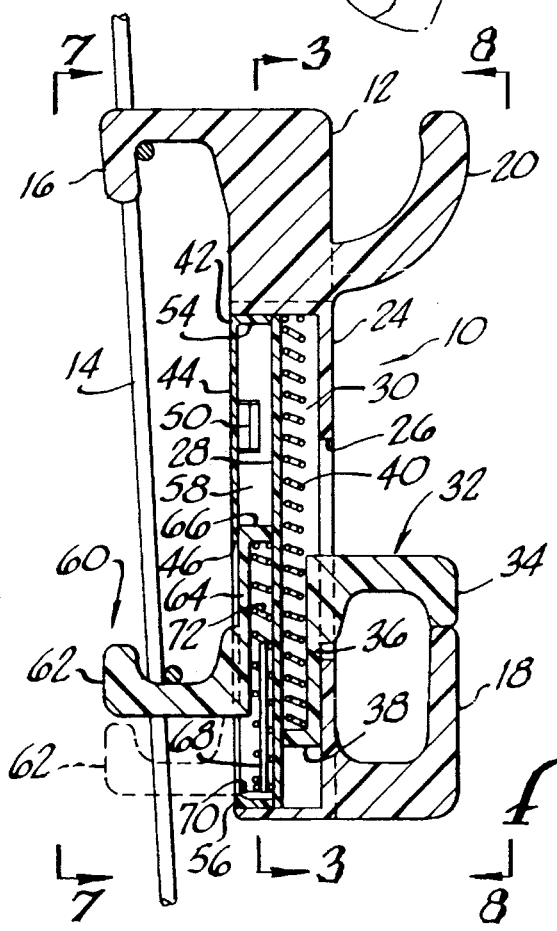
fig. 2.
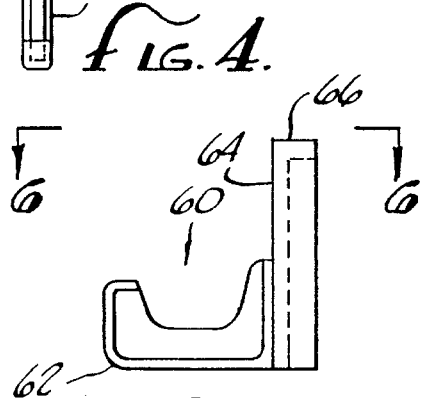
fig. 5.
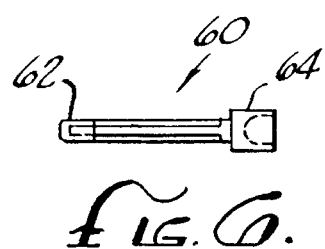
fig. 6.

BAG AND CLOTHING HANGER WITH FENCE CLASP

BACKGROUND OF THE INVENTION

This invention relates to devices for hanging items, such as clothing, equipment bags, and garment bags, from a support structure. More particularly, the present invention relates to a hanger or hook that is removably attachable to a structure, such as a chain link fence.

Participants in a variety of outdoor sports, such as baseball, softball, tennis, and soccer, frequently bring with them articles of clothing and athletic equipment, other personal articles, and bags for carrying such items. Typically, there is no place to put these articles, other than on the ground or on a bench or the like. This is unsatisfactory, in that articles of clothing can become wrinkled or soiled, and other articles can be damaged or cause injury if they are stepped on or tripped over.

To remedy this situation, a number of devices have been developed in the prior art to allow such articles to be hung from the chain link fences that typically enclose athletic playing fields and tennis courts.

For example, U.S. Pat. No. 3,972,499 to Simmons discloses a hook-like hanger having an extension that intertwines between an intersecting pair of wires of a chain link fence. While this device is suitable for hanging a single item of clothing or the like, it may be prone to being shaken loose if the fence is severely jarred.

Another approach is taken by the device disclosed in U.S. Pat. No. 4,953,817 to Mosteller. The Mosteller device includes three fence-engaging arms and hanger member extending from a central hub. Two of the arms extend laterally and are bent rearwardly, terminating in spherical cams. The third arm extends upwardly and is bent forwardly, also terminating in spherical cam. The hanger member forwardly and downwardly from the hub. The device is attached to a chain link fence by feeding the end of the upwardly-extending arm under one diagonal fence wire, and then snapping the cams at the ends of the laterally-extending arms around the distal sides of two adjacent wires that intersect the first wire. While this device may provide a more secure attachment than a device constructed in accordance with the teachings of the Simmons patent, it cannot be adjusted to accommodate fences with different wire spacings. Moreover, like the Simmons device, the Mosteller device is suitable for hanging only one item at a time.

There has thus been unfulfilled need for a device that can hang items from a chain link fence, which can be used on fences of widely varying wire spacings, and which can be used to hang more than one item at a time.

SUMMARY OF THE INVENTION

Broadly, the present invention is a device for hanging articles, such as clothing, equipment bags, and athletic equipment, from a support structure formed from a network of intersecting wires, such as a chain link fence. The device comprises an elongate body having a front side and a rear side. On the rear side is a spring-loaded clasp fence-gripping clasp. On the front side is a fixed hook and a spring-loaded hanger clasp. The spring-loaded fence-gripping clasp is dimensioned for releasably engaging and grasping the wires of a chain link fence. The fixed hook is suitable for hanging an article of clothing, such as a hat, coat, or jacket. The spring-loaded hanger clasp is specifically adapted for hanging an article with a carrying handle or strap, such as an equipment bag.

More specifically, the elongate body has an upper end and a lower end. The spring-loaded fence-gripping clasp has a fixed fence-gripping member or jaw extending rearwardly from the upper end, and a spring-loaded, movable fence-gripping member or jaw extending rearwardly from the lower end. The movable fence-gripping jaw is carried on a rear coil spring that is seated in a rear channel extending longitudinally in the body, so that the movable fence-gripping jaw is biased toward the fixed fence-gripping jaw.

The spring-loaded hanger clasp has a fixed hanger jaw extending forwardly from the lower end of the body. A movable hanger jaw is carried on a front coil spring that is seated in a front channel situated parallel to the rear channel in the body, so that the movable hanger jaw is biased to close against the fixed hanger jaw. The fixed hook extends rearwardly from the upper end of the body, spaced from the upper limit of travel of the movable hanger jaw.

The present invention offers a number of advantages. For example, the fence-gripping clasp provides secure attachment to chain link fences having a wide variety of wire spacings, and also allows attachment to other types of support structures, particularly those having a portion formed of a network of intersecting wires or rods. This type of spring-loaded clasp is also capable of supporting a significant amount of weight. The provision of the second spring-loaded clasp, comprising the fixed and movable hanger jaws, along with the fixed hook, allows the device to be used two hang a multitude of different articles, at least two at a time. These and other advantages will be apparent from the detailed description of the invention that follows.

BRIEF DESCRIPTION OF THE DRAWINGS

FIG. 1 is a perspective view of a preferred embodiment of the present invention, showing it attached to a chain link fence, and having a coat and an equipment bag hung from it;

FIG. 2 is a longitudinal cross-sectional view of the present invention, showing it attached to a chain link fence;

FIG. 3 is a cross-sectional view of the present invention, taken along line 3—3 of FIG. 2;

FIG. 4 is a cross-sectional view taken along line 4—4 of FIG. 3;

FIG. 5 is an elevational view of the movable fence-gripping jaw used in the present invention;

FIG. 6 is a top plan view of the jaw shown in FIG. 5, taken along line 6—6 of FIG. 5;

DETAILED DESCRIPTION OF THE PREFERRED EMBODIMENT

Figure 7:
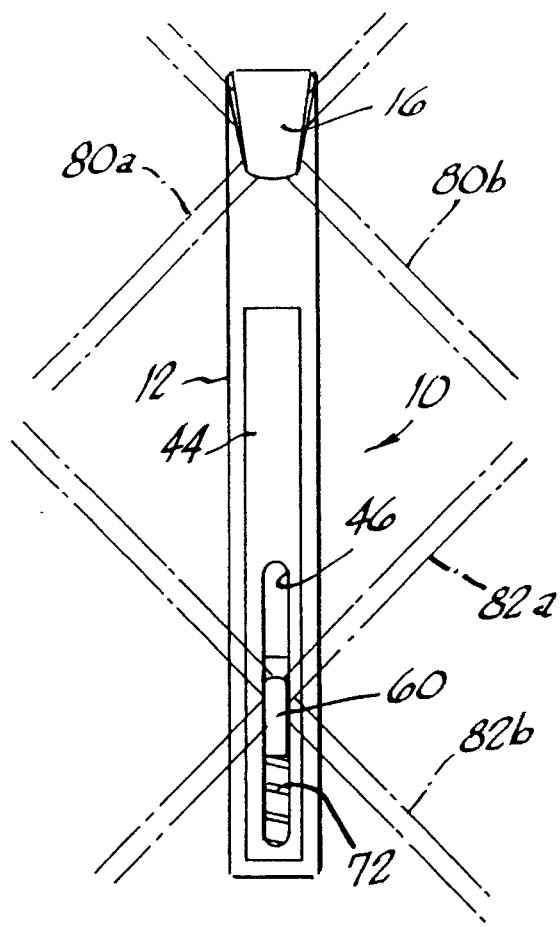
FIG. 7 is a rear elevational view of the present invention, taken along line 7—7 of FIG. 2.

Referring now to the drawings, a bag and clothing hanging device 10, in accordance with a preferred embodiment of the invention, will now be described in detail.

As shown in FIGS. 1, 2, and 3, the hanging device 10 includes an elongate body 12, preferably of polycarbonate plastic, having an upper end and a lower end. The device is shown attached to a chain link fence 14. The convention will be adopted in this specification that the side of the device 10 facing toward the fence is the rear, while the side facing away from the fence is the front.

The body 12 includes an integral, fixed fence-gripping jaw 16 extending rearwardly and downwardly from the rear side of the upper end of the body 12. An integral, fixed hanger jaw 18 extends forwardly and upwardly from the front side of the lower end of the body 12, and an integral clothes hook 20 extends forwardly and upwardly from the front side of the upper end of the body.

The body 12 includes a pair of parallel side walls 22 and a front wall 24. The side walls 22 and the front wall 24 thus define a longitudinal body cavity that is open to the rear. The front wall 24 has a longitudinal slot 26, the opposite ends of which are spaced from the juncture with the fixed hanger jaw 18 and the juncture with the clothes hook 20, respectively. A spacer plate 28, preferably of polycarbonate plastic, is fixed longitudinally in the body cavity rearwardly of, and parallel to, the front wall 24. A longitudinal front channel 30 is thus defined between the spacer plate 28 and the front wall 24. The front channel 30 has a lower end adjacent the lower end of the body 12, and an upper end longitudinally spaced therefrom.

A movable hanger jaw 32 is installed in the slot 26 so as to be longitudinally movable therein toward and away from the fixed hanger jaw 18. Specifically, the movable hanger jaw 32 has a grasping portion 34 that rides in the slot 26, extending forwardly and downwardly from the body 12, so as to oppose the fixed hanger jaw 18. Rearward of the grasping portion 34 is a longitudinal retention portion 36 that is wider than the slot 26, and that slidingly engages the inner or rear surface of the front wall 24. The retention portion 36 is thus movable longitudinally in the front channel 30 toward and away from the fixed hanger jaw 18. The lower end of the retention portion 36 terminates in a short, horizontal, rearwardly extending flat 38.

An elongate front coil spring 40 is retained in the front channel 30. The upper end of the spring 40 is engaged against the upper end of the channel 30, while the lower end of the spring 40 is seated against the flat 38. The spring 40 thus biases the movable hanger jaw 32 to close against the fixed hanger jaw 18. The fixed hanger jaw 18, the movable hanger jaw 32, and the front coil spring 40 thus form a spring-loaded hanger clasp.

Referring now to FIGS. 2, 3, and 4, a cartridge 42 is inserted into the body cavity through the open rear portion of the body 12. The cartridge 42 is an elongate unitary member, open toward the front, and having a rear wall 44 with a longitudinal slot 46 therein. Joined to the rear wall 44, and extending forwardly therefrom, are a pair of parallel vertical side walls 48, each of which is interrupted by a pair of longitudinally-spaced, outwardly-extending retention tabs 50 that register with and engage corresponding slots 52 in the side walls 22 of the body 12 for retention of the cartridge 42 in the body cavity. The side walls 48 and the rear wall 44 extend longitudinally (vertically, as oriented in the drawings) between horizontally-extending upper and lower ends 54 and 56, respectively, the lower cartridge end 56 thus being located adjacent to the lower end of the body 12, and the upper cartridge end 54 thus being longitudinally spaced therefrom. The upper cartridge end 54 and the lower cartridge end 56 respectively form the upper and lower ends of a longitudinal rear channel 58, adjacent and parallel to the first longitudinal channel 30, that is thus defined between the spacer plate 28 and the cartridge rear wall 44.

A movable fence-gripping jaw 60 is installed in the longitudinal slot 46 of the cartridge rear wall 44, so as to be longitudinally movable therein toward and away from the fixed fence-gripping jaw 16. Specifically, the movable fence-gripping jaw 60 has a grasping portion 62 that rides in the slot 46, extending rearwardly and upwardly from the body 12, so as to oppose the fixed fence-gripping jaw 16. Forward of the grasping portion 62 is a longitudinal retention portion 64 that is wider than the slot 46, and that slidingly engages the inner or forward surface of the cartridge rear wall 44. The retention portion 64 is thus movable longitudinally in the rear channel 58 toward and away from the fixed fence-gripping jaw 16. The upper end of the retention portion 64 terminates in a short, horizontal, forwardly-extending flat 66.

An elongate spring guide rod 68 has a lower end terminating in a flattened head 70 that is seated against the lower end 56 of the cartridge 42, that is, against the lower end of the rear channel 58. The spring guide rod 68 extends upwardly through the rear channel 58. Disposed coaxially around the guide rod 68 is an elongate rear coil spring 72 that is retained in the second longitudinal channel 58. The rear coil spring 72 has a lower end that seats against the guide rod head 70, and an upper end that seats against the flat 66 of the retention portion 64 of the movable fence-gripping jaw 60. The spring 72 thus biases the movable fence-gripping jaw 60 toward the fixed fence-gripping jaw 16. The fixed fence-gripping jaw 16, the movable fence-gripping jaw 60, and the rear coil spring 72 thus form a spring-loaded fence clasp.

Figure 8:
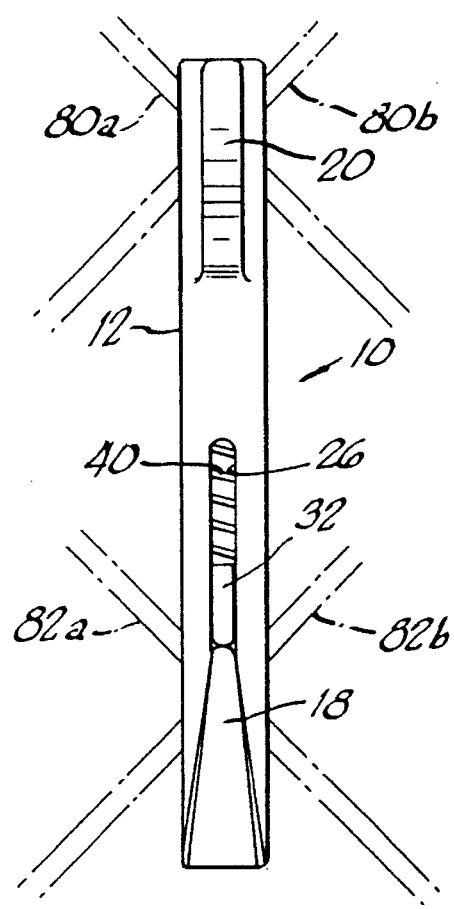
FIG. 8 is a front elevational view of the present invention; taken along line 8—8 of FIG. 2.

As shown in FIGS. 1, 7, and 8, the device 10 is releasably secured to the chain link fence 14 with the fence clasp by first hooking the fixed fence-gripping jaw 16 over a first intersecting pair of fence wires 80a and 80b, and then pulling the movable fence-gripping jaw 60 downwardly (as shown in the broken outline in FIG. 2) against the force of the rear coil spring 72 until it hooks under the next lower pair of intersecting fence wires 82a and 82b. The rear coil spring biases the movable fence-gripping jaw 60 toward the fixed fence-gripping jaw 18 to secure the device 10 to the fence 14. The fence-gripping clasp provided by the two fence-gripping jaws can thus be used to secure the device to chain link fences of differing geometries and wire spacings, and it can also be used on other types of fences and vertical support structures that have at least a portion formed of intersecting wires or rods.

With the device 10 thus secured, an article of clothing, such as a jacket 90, or a piece of athletic equipment, such as a baseball glove (not shown), can be hung on the clothes hook 20. Another article, such as an equipment bag 92 with a strap 94, can be suspended from the hanger clasp by pulling the movable hanger jaw 30 upwardly against the force of the front coil spring 40 to separate it from the fixed hanger jaw 18, then placing the strap 94 between the two hanger jaws, and then releasing the movable hanger jaw to close against the fixed hanger jaw. The hanger clasp provided by the two hanger jaws can be used to hang a wide variety of articles, such as baseball gloves, clothing bags, and articles of clothing.

From the foregoing, it can be seen that the present invention provides a device that can be securely, yet releasably, attached to a wide variety of chain link and other types of fences, as well as other types of support structures. In addition, the device can be used to hang two or more articles, and, because the fence-gripping clasp provides a very secure attachment, the load supported by the device can include articles of substantial weight. The device can be economically manufactured from molded plastic components, preferably from a polycarbonate plastic, as described above.

While a preferred embodiment of the invention has been described above and illustrated in the drawings, several modifications and variations may suggest themselves to those skilled in the pertinent arts. For example, the fixed clothes hook may be made removable, or omitted altogether. As an alternative, instead of a fixed clothes hook, a second spring-loaded hanger clasp can be provided above the first hanger clasp, using another coil spring mounted above the front coil spring, or even using the upper portion of the front coil spring. As another alternative, the body of the device can be lengthened to provide two fixed clothes hooks in tandem. These and other variations should be considered within the spirit and scope of the invention, as defined in the claims that follow.

What is claimed is:

1. A device for hanging articles of clothing, athletic equipment and the like from a support structure formed of a network of intersecting wires, the device comprising:

an elongate body defining a first and a second channel extending longitudinally and positioned side by side in said elongated body said first and second channels respectively containing a first and a second spring, wherein said elongated body has a first longitudinal slot in a first wall providing access to said first channel and a second longitudinal slot in a second wall providing access to said second channel;

a movable hanger jaw member slidably mounted in said first longitudinal slot so as to be movable in a first and a second direction and so as to extend outward from said first wall, said movable hanger jaw member including a flat portion operatively engaged with said first spring so that said first spring urges said movable hanger jaw member in said second direction;

a fixed hanger jaw member connected to said elongated body, wherein said fixed hanger jaw member comprises a substantially hook-shaped member extending outward from said first wall a first distance and then extending in said first direction;

a movable gripping jaw member slidably mounted in said second longitudinal slot so as to be movable in said first and said second directions and so as to extend outward from said second wall, said movable gripping jaw member including a flat portion operatively engaged with said second spring so that said second spring urges said movable gripping jaw member in said first direction; and a fixed gripping jaw member connected to said second wall of said elongated body, wherein said fixed gripping jaw member comprises a substantially hook-shaped member extending outward from said second wall a second distance and then extending in said second direction.

2. The device of claim 1, wherein said fixed hanger jaw member is connected to said elongate body at substantially a first end of said elongate body and said fixed gripper jaw is connected to said elongate body at substantially a second end of said elongate body.

3. The device of claim 2, further comprising a clothes hook connected to said first wall of said elongate body at substantially said second end of said body.

4. The device of claim 3, wherein said clothes hook, said fixed hanger jaw and said fixed gripping jaw are integrally connected to said elongate body.

5. The device of claim 1, further comprising a spacer plate separating said first and said second longitudinal channels and a cartridge positioned in said elongate body adjacent said spacer plate so that said cartridge and said spacer plate define said second longitudinal channel.

6. The device of claim 1, wherein said movable hanger jaw extends outward from said first wall said first distance and then extends in said second direction so that said first spring urges the portion of said movable hanger jaw extending in said second direction to contact the portion of said fixed hanger jaw extending in said first direction.

7. The device of claim 6, wherein said movable gripping jaw extends outward from said second wall said second distance and then extends in said first direction so that said second spring urges the portion of said movable gripping jaw extending in said first direction to contact the portion of said fixed gripping jaw extending in said second direction.

8. The device of claim 1, wherein said fixed and said movable hanger jaws are configured to clasp and securely retain a strap of an athletic bag.

9. The device of claim 1, wherein said fixed and said movable gripping jaws are configured to clasp and secure said device to a chain link fence.

10. A hanger for hanging bags, articles of clothing, and the like from a porous fence structure comprising a network of overlapping wires which form a plurality of wire intersections, the hanger comprising:

a body having a front side and a rear side, said rear side further comprising:

a first hook on said rear side for engaging a first wire intersection, said first hook being specially adapted to engage the wire intersection;

a second hook mounted on said rear side of said hanger body, said second hook being spaced apart from and longitudinally aligned with said first hook, said second hook having a narrow profile so as to be specially adapted to engage an adjacent wire intersection;

one of said first or second hooks being biased toward the other to provide a gripping force to maintain said hanger in gripping relation with respect to said first wire intersection and said adjacent wire intersection;

a third hook mounted on the front side of said body, for hanging bags, articles of clothing and the like, on said fence structure; and a spring biased hanger jaw which is positioned on said front side of said body and is biased so as to form a retaining position with said third hook to retain said bags, articles of clothing and the like, on said third hook.

* * * * *